United States Patent
Takahashi et al.

(12) 
(10) Patent No.: US 6,471,892 B1
(45) Date of Patent: Oct. 29, 2002

(54) METHOD OF PRODUCING TAPE TYPE OPTICAL FIBER CORE WIRE

(75) Inventors: Ken Takahashi, Kanagawa (JP); Shigenori Takaki, Kanagawa (JP); Ryoei Oka, Osaka (JP); Tomoyuki Hattori, Kanagawa (JP); Toshihisa Sato, Kanagawa (JP); Kohei Kobayashi, Kanagawa (JP); Kaoru Okuno, Kanagawa (JP)

(73) Assignee: Sumitomo Electric Industries, Ltd., Osaka (JP)

(*) Notice: Subject to any disclaimer, the term of this patent is extended or adjusted under 35 U.S.C. 154(b) by 0 days.

(21) Appl. No.: 09/554,683

(22) PCT Filed: Dec. 3, 1998

(86) PCT No.: PCT/JP98/05466

§ 371 (c)(1),
(2), (4) Date: May 18, 2000

(87) PCT Pub. No.: WO99/28777

PCT Pub. Date: Jun. 10, 1999

(30) Foreign Application Priority Data

Dec. 4, 1997 (JP) .............................. 9/334374

(51) Int. Cl.[7] .............................................. B29D 11/00
(52) U.S. Cl. .................. 264/1.28; 264/1.29; 427/163.2
(58) Field of Search .............................. 264/1.27, 1.28, 264/1.29; 425/113, 114; 427/163.2

(56) References Cited

U.S. PATENT DOCUMENTS 5,976,611 A * 11/1999 Okuno et al. ............. 427/163.2
6,309,567 B1 * 10/2001 Okuno et al. .............. 264/1.27
6,333,071 B1 * 12/2001 Kobayashi et al. ......... 156/166

FOREIGN PATENT DOCUMENTS

| JP | 61-73112 | 4/1986 |
|----|----------|--------|
| JP | 2-210407 | 8/1990 |
| JP | 3-55509 | 3/1991 |
| JP | 4-316006 | 11/1992 |
| JP | 6-63483 | 3/1994 |
| JP | 6-64943 | 3/1994 |
| JP | 7-209565 | 8/1995 |

* cited by examiner

*Primary Examiner*—Mathieu D. Vargot
(74) *Attorney, Agent, or Firm*—McDermott, Will & Emery (57) ABSTRACT

In a method of making a ribbon type coated optical fiber 3 comprising the step of inserting a plurality of optical fibers 1 flatly arranged parallel to each other through a die orifice 11a so as to collectively coat the optical fibers with a coating resin 2, the ratio W/H of a clearance W in the width direction between the inner surface of the die orifice 11a and the outer surface of the optical fibers 1 to a clearance H in the thickness direction therebetween is set within the range of 1.0 to 2.5.

11 Claims, 8 Drawing Sheets

| | Clearance ratio (W/H) | UV resin viscosity (CPS) | UV resin coating pressure (kg/cm²) | Coated optical fiber | State of coating surface (Center depression /protrusion) in ribbon type coated optical fiber | State of arrangement in ribbon type coated optical fiber |
|---|---|---|---|---|---|---|
| Comp. EX1 | 0.8 | 1000~4000 | 0.5~3.0 | 4 | C- | Poor |
| EX 1 | 1.0 | 1000~4000 | 0.5~3.0 | 4 | B- | Good |
| EX 2 | 1.3 | 1000~4000 | 0.5~3.0 | 4 | A | Good |
| EX 3 | 1.8 | 1000~4000 | 0.5~3.0 | 4 | A | Good |
| EX 4 | 2.3 | 1000~4000 | 0.5~3.0 | 4 | A | Good |
| EX 5 | 2.5 | 1000~4000 | 0.5~3.0 | 4 | B+ | Good |
| Comp. EX2 | 2.8 | 1000~4000 | 0.5~3.0 | 4 | C+ | Poor |
| Comp. EX3 | 0.8 | 1000~4000 | 0.5~3.0 | 8 | C- | Poor |
| EX 6 | 1.0 | 1000~4000 | 0.5~3.0 | 8 | B- | Good |
| EX 7 | 1.3 | 1000~4000 | 0.5~3.0 | 8 | A | Good |
| EX 8 | 1.8 | 1000~4000 | 0.5~3.0 | 8 | A | Good |
| EX 9 | 2.3 | 1000~4000 | 0.5~3.0 | 8 | A | Good |
| EX 10 | 2.5 | 1000~4000 | 0.5~3.0 | 8 | B+ | Good |
| Comp. EX4 | 2.8 | 1000~4000 | 0.5~3.0 | 8 | C+ | Poor |
| Comp. EX5 | 0.8 | 1000~4000 | 0.5~3.0 | 12 | C- | Poor |
| EX 11 | 1.0 | 1000~4000 | 0.5~3.0 | 12 | B- | Good |
| EX 12 | 1.3 | 1000~4000 | 0.5~3.0 | 12 | A | Good |
| EX 13 | 1.8 | 1000~4000 | 0.5~3.0 | 12 | A | Good |
| EX 14 | 2.3 | 1000~4000 | 0.5~3.0 | 12 | A | Good |
| EX 15 | 2.5 | 1000~4000 | 0.5~3.0 | 12 | B+ | Good |
| Comp. EX6 | 2.8 | 1000~4000 | 0.5~3.0 | 12 | C+ | Poor |

METHOD OF PRODUCING TAPE TYPE OPTICAL FIBER CORE WIRE

TECHNICAL FIELD

The present invention relates to a method of making a ribbon type coated optical fiber.

BACKGROUND ART

The making of a ribbon type coated optical fiber comprises the steps of arranging a plurality of already manufactured optical fibers (referring to glass fibers having their outer periphery coated with a resin) in alignment with each other; passing the optical fibers through a die to which a coating resin is supplied, so as to collectively coat the optical fibers with the resin into a ribbon form; curing the resin with a curing apparatus; and taking up the resulting ribbon type coated optical fiber with a take-up apparatus by way of a capstan, a pulley, and the like. It is not easy to effect collective coating while correctly keeping the state of alignment of the optical fibers. Methods of improving this coating are disclosed in Japanese Patent Application Laid-Open No. HEI 6-63483 and Japanese Patent Application Laid-Open No. HEI 7-209565, for example.

DISCLOSURE OF THE INVENTION

However, in the gap between the optical fibers and the die, if the difference between the gap in the thickness direction and that in the width direction increases, then a difference occurs between the resin pressure in the thickness direction and that in the width direction, whereby the state of arrangement of the optical fibers may be disordered, or irregularities may occur in the coating surface. It is an object of the present invention to provide a method of making a ribbon type coated optical fiber which can overcome such problems and yield favorable states of surface coating and arrangement.

This method of making a ribbon type coated optical fiber is a method of making a ribbon type coated optical fiber comprising the step of inserting a plurality of optical fibers flatly arranged parallel to each other through a die orifice of a coating apparatus so as to collectively coat the optical fibers with a coating resin, wherein the ratio W/H of a clearance W in a width direction between an inner surface of the die orifice and an outer surface of the optical fibers to a clearance H in a thickness direction therebetween is set within the range of 1.0 to 2.5.

According to this manufacturing method, in the clearance between the die orifice and the flatly arranged optical fibers inserted therethrough, the ratio W/H of the clearance W in the width direction to the clearance H in the thickness direction is defined within the range of 1.0 to 2.5, preferably within the range of 1.2 to 1.9.

As a result of such selection, respective resin pressures in the clearances H and W become substantially even, whereby the state of arrangement of the optical fibers can be held correctly, and the coating surface can be formed smoothly. As the coating resin flows from the higher pressure side to the lower pressure side within the die, the optical fibers shift along the flow of the resin. If a plurality of optical fibers shift, then their arrangement may be disordered, or the amount of coating of the resin may change so that irregularities occur in the surface. With in the range where the clearance ratio W/H is 1.0 to 2.5, such problems can be suppressed.

One of the factors responsible for the difference in resin pressure occurring between the clearances H and W is the difference in the gap (clearance) formed between the optical fibers and the die orifice. In general, if the clearances H and W differ from each other, the resin pressure will be higher on the narrower clearance side and lower on the broader clearance side.

Another factor responsible for the difference in resin pressure occurring between the clearances H and W is the form of arrangement of optical fibers at the time when they are passed through the die orifice. For example, in the case where the optical fibers are inserted therethrough while being arranged flatly, there is empirically a tendency that, even if the respective clearances H and W in the thickness and width directions are equal to each other, the resin pressure in the thickness direction becomes lower, whereas that in the width direction becomes higher. As a consequence, it is important that the clearances H and W be determined in view of these factors, so as to make the resin pressures even.

In the above-mentioned coating method, the difference in resin pressure is also influenced by the melt viscosity and resin pressure at the time of coating of the coating resin, and affects the arrangement of the optical fibers and the smoothness in their surface. It is preferred that the coating resin be supplied to the die orifice while the melt viscosity of the coating resin is held within the range of 1000 to 4000 cps, and the range of 2000 to 3000 cps is optimal. It becomes difficult to stably keep the form of the ribbon if the melt viscosity is 1000 cps or less, whereas a melt viscosity of 4000 cps or greater is inappropriate for high-speed coating. Also, it is preferred that the resin be supplied to the die orifice while the resin pressure is held within the range of 0.5 to 3.0 $kg/cm^2$, and the range of 0.8 to 2.0 $kg/cm^2$ is optimal. A resin pressure of 0.5 $kg/cm^2$ or less is inappropriate for high-speed coating, whereas it becomes difficult to stably keep the form of the ribbon if the resin pressure is 3.0 $kg/cm^2$ or greater.

The method of making a ribbon type coated optical fiber may comprise a step of, while flatly arranging a plurality of optical fibers parallel to each other, inserting the optical fibers through a die orifice of a sub-unit coating apparatus and coating the optical fibers with an inner layer coating resin so as to form at least two sub-units; and a step of, while flatly arranging at least two sub-units parallel to each other, inserting the sub-units through a die orifice of an outer layer coating apparatus and collectively coating the sub-units with an outer layer coating resin so as to form the ribbon type coated optical fiber; wherein the ratio Ws/Hs of a clearance Ws in a width direction between an inner surface of the sub-unit die orifice and an outer surface of the sub-units to a clearance Hs in a thickness direction therebetween is set within the range of 1.0 to 2.5, and wherein the ratio Wg/Hg of a clearance Wg in the width direction between an inner surface of the outer layer die orifice and the outer surface of the sub-units to a clearance Hg in the thickness direction therebetween is set within the range of 1.0 to 2.5.

According to this manufacturing method, the step of coating the outer periphery of a plurality of optical fibers with the inner layer resin to form sub-units and the step of coating the outer periphery of at least two sub-units with the outer layer resin to form the ribbon type coated optical fiber are under the same condition as the first manufacturing method mentioned above.

As a consequence, the resin pressure can be made substantially even in each of the sub-unit die orifice and the outer layer die orifice, whereby the state of arrangement of optical fibers or sub-units can be kept correctly, and the coating surface can be formed smoothly.

Also, in the method mentioned above, it is preferred that, on a disc-shaped die disposed within a cylindrical sleeve, a substantially cylindrical nipple be disposed so as to form a gap between an outer peripheral face of the nipple and an inner peripheral face of the sleeve, and a resin be introduced from the gap toward a die orifice of the die, so that a plurality of the above-mentioned optical fibers positioned within the die orifice are coated with this resin.

BEST MODES FOR CARRYING OUT THE INVENTION

In the following, embodiments of the present invention will be explained in detail with reference to the accompanying drawings. Here, in the explanation of the drawings, constituents identical to each other will be referred to with numerals or letters identical to each other without repeating their overlapping descriptions.

(Embodiment 1)

Figure 1:
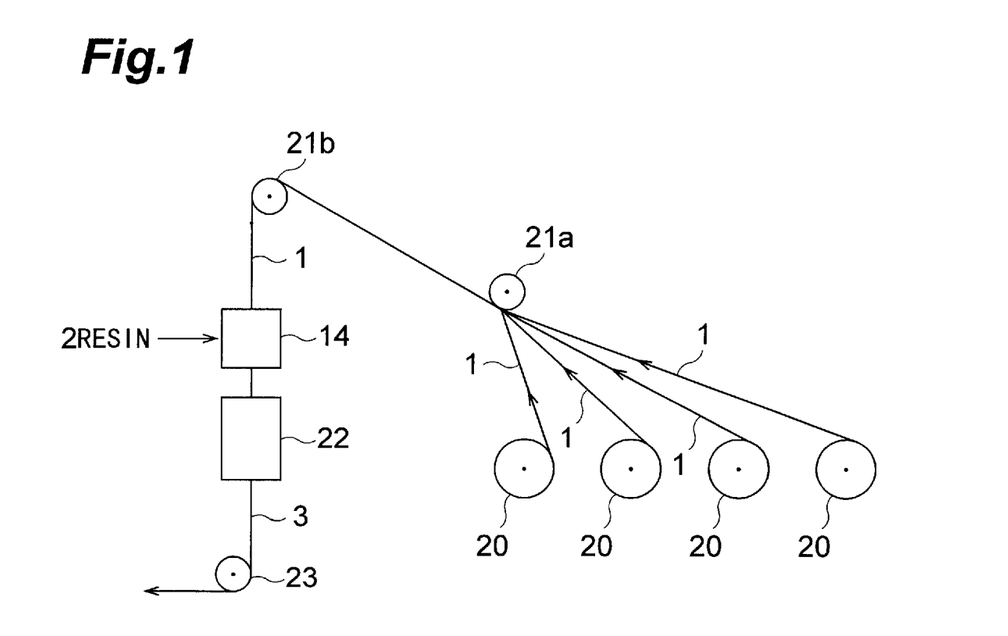
FIG. 1 is a schematic view of an apparatus for making a ribbon type coated optical fiber in accordance with Embodiment 1.

FIG. 1 is a schematic view of an apparatus for making a ribbon type coated optical fiber in accordance with Embodiment 1. In FIG. 1, a plurality of optical fibers 1 reeled out of their respective bobbins 20 are flatly aligned with each other while passing through grooved guide rollers 21a, 21b, so as to be supplied to a coating apparatus 14. While passing through the coating apparatus 14, the optical fibers 1 are coated with a resin 2 which is introduced in the arrowed direction under pressure by a pump of an unshown resin supply tank, and the resin is cured with a resin curing apparatus 22 using a heater or ultraviolet lamp, whereby a ribbon type coated optical fiber 3 is formed. The ribbon type coated optical fiber 3 is taken up by an unshown take-up apparatus by way of a flat guide roller 23.

Figure 2:
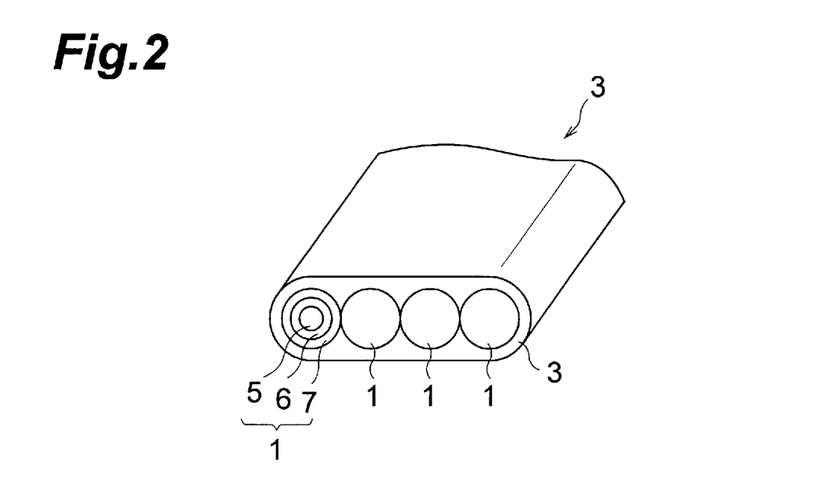
FIG. 2 is a perspective view showing the configuration of a ribbon type coated optical fiber.

As shown in FIG. 2, the ribbon type coated optical fiber 3 is formed by applying a collective coating layer 4 to the outer periphery of a plurality of (in general, 2, 4, 8, 12, or 16) optical fibers 1 flatly arranged parallel to each other. Each optical fiber 1 is formed with an outside diameter of 250 $\mu$m by a silica type glass fiber 5 having a diameter of 125 $\mu$m, a coating layer 6 disposed around the outer periphery of the glass fiber 5 and made of a silicone resin or UV-curable resin, and a coloring layer 7 disposed around the outer periphery of the coating layer 6.

Figure 3:
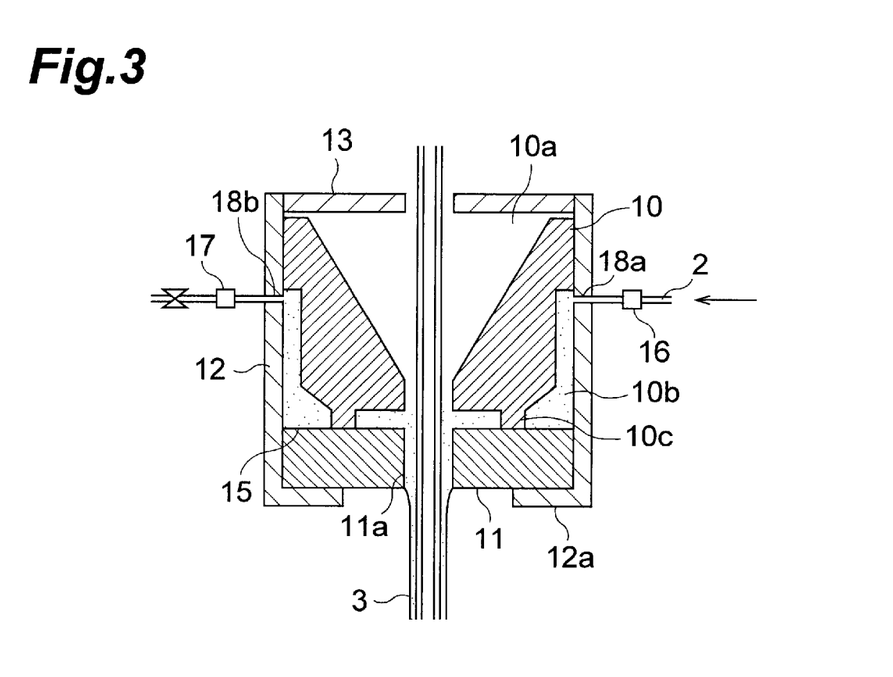
FIG. 3 is a sectional view showing the configuration of a coating apparatus employed in Embodiment 1.
Figure 4:
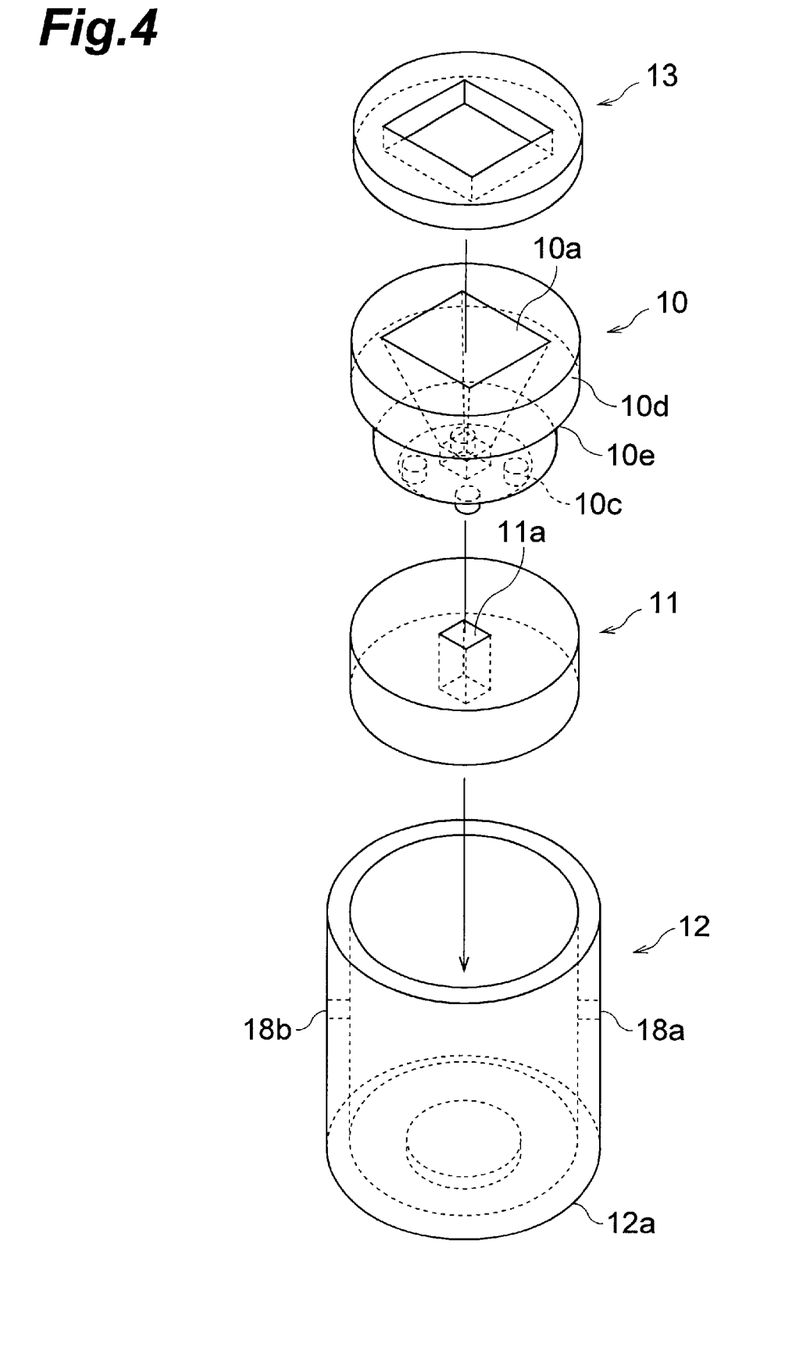
FIG. 4 is a perspective view showing members of the coating apparatus and a method of assembling them.

FIGS. 3 and 4 are views showing the configuration of the coating apparatus in accordance with this embodiment. FIG. 3 is a sectional view showing the configuration of the coating apparatus 14, in which a nipple 10 and a die 11, while forming a gap for passing the resin 2 therethrough, are accommodated in a sleeve 12 and are fixed with a lid 13 thereon. A side wall of the sleeve 12 has a resin introducing orifice 18a and a discharge orifice 18b for discharging a part of the resin, whereas a temperature sensor 16 and a pressure sensor 17 are disposed on the inlet side of the resin introducing orifice 18a and the exit side of the resin discharge orifice 18b, respectively.

FIG. 4 is a perspective view showing members constituting the coating apparatus and a method of assembling them. The nipple 10 is a thick substantially cylindrical body having a nipple orifice 10a in the center thereof and a lower end face provided with four protrusions 10c, while providing a gap with respect to the upper face of the disc-shaped die 11, so as to form a flow path 15 for the resin 2. The outer periphery of the die 11 has an outer peripheral face 10d to mate with the inner peripheral face of the sleeve 12 and an outer peripheral face 10e with a diameter smaller than that of the former outer peripheral face 10d, thereby forming a gap 10b with respect to the inner peripheral face of the sleeve 12 so that the resin 2 can pass therethrough. The nipple orifice 10a comprises, successively from the upper side, a tapered opening portion and a rectangular opening portion.

The die 11 is a disc having a die orifice 11a which is concentric with the nipple orifice 10a, and flat upper and lower end faces orthogonal to the die orifice 11a. Usually, the die orifice 11a is a pillar-like opening portion having a track form.

The sleeve 12 is a thin cylindrical body whose lower end portion has a bottom 12a formed with an orifice in the center thereof for passing the ribbon type coated optical fiber 3 therethrough.

The coating apparatus 14 is assembled by introducing the die 11 and the nipple 10 into the sleeve 12 and screwing the lid 13 thereon. The die 11 and the nipple 10 are secured with the sleeve bottom 12a the lid 13.

The flow path of the coating resin will now be explained. The resin 2 is supplied from the resin introducing orifice 18a under pressure, so as to pass through the gap 10b between the outer peripheral face 10e of the nipple and the inner peripheral face of the sleeve 12, and then is uniformly supplied from the periphery of the orthogonal flow path 15 toward the center, thereby reaching the portion within the inlet of the die orifice 11a. This resin 2 passes through the die orifice 11a together with the optical fibers 1 and is collectively applied to the outer periphery of the optical fibers 1 arranged like a ribbon.

Figure 5:
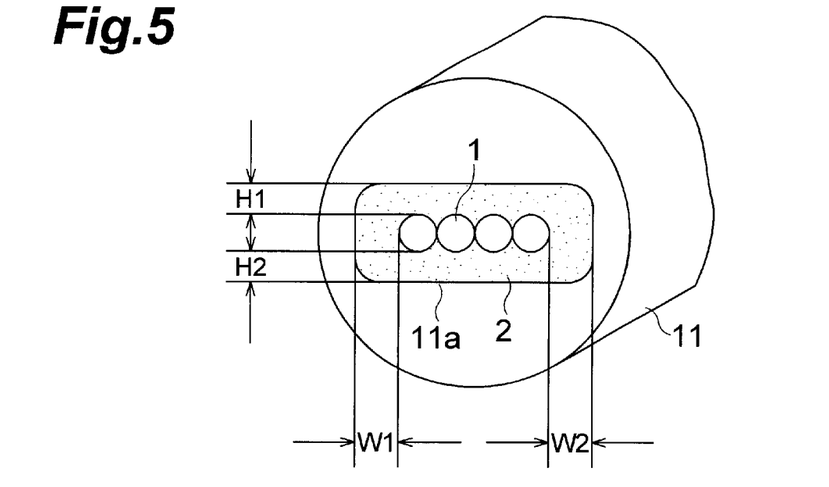
FIG. 5 is a perspective view showing the state of optical fibers and a resin at the time when they pass through a die.

FIG. 5 is a perspective view showing a state where the optical fibers and the resin pass through the die. The optical fibers 1 flatly aligned parallel to each other pass through the die orifice 11a, whereas the resin 2 passes through the gap between the inner wall face of the die orifice 11a and the optical fibers 1.

The relative positions of the optical fibers 1 and the die orifice 11a are adjusted such that clearances H1 and H2 in the thickness direction between the inner surface of the die orifice 11a and the outer surface of the optical fibers 1 equal each other, and clearances W1 and W2 in the width direction therebetween equal each other. Here, the state where the clearances H1 and H2 equal each other is defined as "clearance H in the thickness direction," whereas the state where the clearances W1 and W2 equal each other is defined as "clearance W in the width direction." At this time, the position where the optical fibers 1 pass is determined by the guide rollers 21b and 23 as shown in FIG. 1, whereas the plurality of optical fibers 1 can be made substantially parallel to each other by elongating the distance between the guide rollers 21a and 21b and the distance between the guide roller 21b and the coating apparatus 14.

Though the resin 2 flows from the inlet side of the die 11 where the resin pressure is higher to the outlet side where the resin pressure is lower, the flow will be complicated if a pressure difference exists within the cross section of the die orifice 11a. In FIG. 3, if the clearance H provided between the die orifice 11a and the optical fibers 11 in the thickness direction of the optical fibers and the clearance W therebetween in the width direction differ from each other, the pressure will locally yield a difference due to the resin flow, thus making the resin pressure higher and lower on the sides where the clearance is narrower and wider, respectively.

Another factor responsible for generating a difference in resin pressure between the clearances H and W is the form of arrangement of the optical fibers passing through the die orifice 11a. For example, when the optical fibers 1 are flatly arranged, there is empirically a tendency that, even if the respective clearances H and W in the thickness and width directions are equal to each other, the resin pressure in the thickness direction becomes lower, whereas that in the width direction becomes higher. Therefore, it is the most important to determine the clearances H and W in view of these factors, so as to make the resin pressures even.

If a difference occurs in resin pressure between the clearances H and W, the resin 2 in the die orifice 11a will flow from the higher resin pressure side to the lower resin pressure side, whereby the optical fibers 1 will shift along the flow of the resin 2. If a plurality of optical fibers 1 shift, then their arrangement may be disordered so that they partly overlap each other, or the amount of coating of the resin 2 may change so that irregularities appear in the coating surface. Further, manufacturing conditions such as the melt viscosity of the resin 2, the pressure at the time of coating, and the like will influence the above-mentioned resin coating state.

Therefore, by prototyping the ribbon type coated optical fiber 3 by using the covering apparatus shown in FIG. 1 and the coating apparatus 14 shown in FIGS. 3 and 4, the inventors carried out various studies concerning influences of the number of cores of the optical fibers 1 passing through the die orifice 11a, the ratio W/H of the clearances W and H between the die orifice 11a and the optical fibers 1, the melt viscosity of the resin 2, or the resin pressure at the time of coating upon disorders in arrangement of the optical fibers 1 and surface irregularities thereof.

Figure 16:
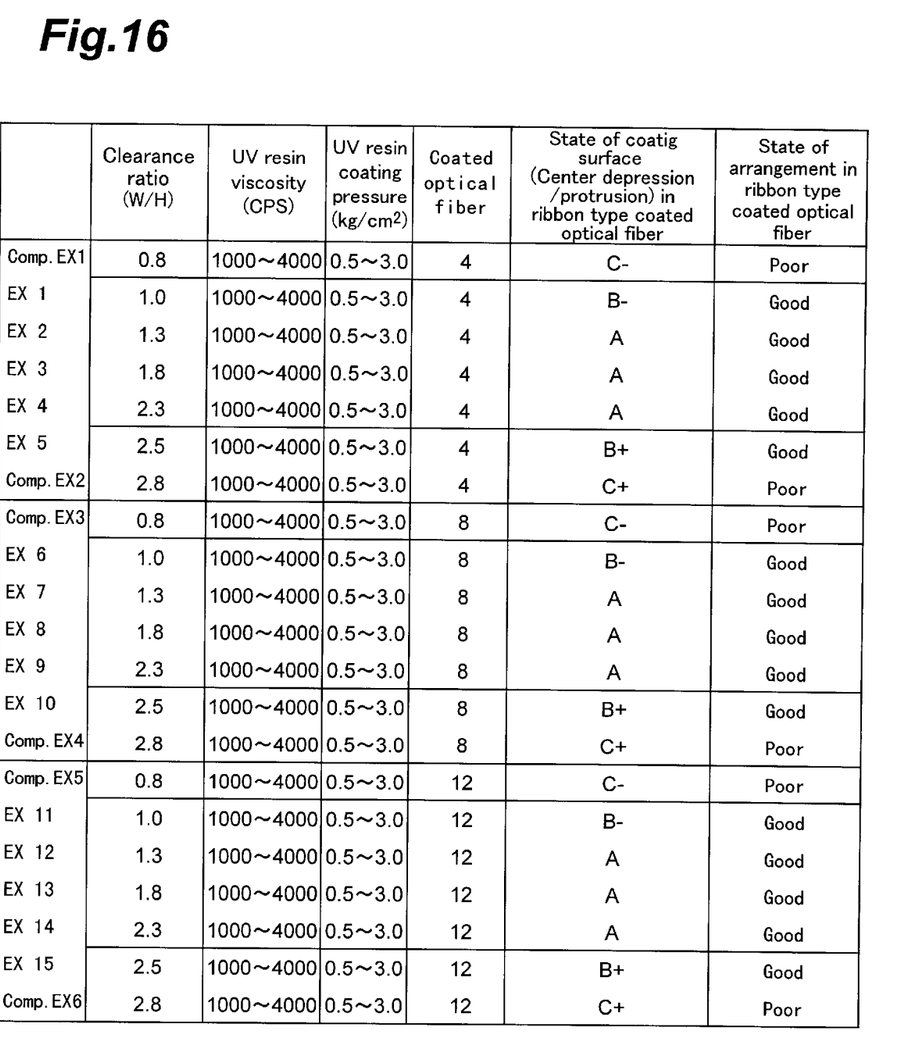
FIG. 16 is a table showing manufacturing conditions of ribbon type coated optical fibers and results of coated optical fibers obtained thereby.

As the coating 2 with which the ribbon type coated optical fiber 3 is collectively coated, a urethane acrylate type UV-curable resin is used, and the melt viscosity of the resin is adjusted according to its temperature at the time when it is supplied to the die orifice 11a, whereas this temperature is measured by the temperature sensor 16 disposed on the inlet side of the resin introducing orifice 18a of the coating apparatus 14 and is fed back to the resin 2 within a resin supply tank which is not depicted. The resin pressure at the time of coating of the UV-curable resin 2 is adjusted according to the pressure at the time when it is supplied to the coating apparatus 14, whereas this pressure is measured by the pressure sensor 17 disposed at the resin discharge orifice 18b of the coating apparatus 14 and is fed back to a pump within the unshown resin supply tank. FIG. 16 shows manufacturing conditions of the ribbon type coated optical fiber 3 and results of coated optical fibers obtained thereby.

The ribbon type coated optical fiber 3 prepared according to the above-mentioned method was cut at constant intervals, and the state of arrangement of the optical fibers 1 and irregularities in the coating surface were measured.

Figure 6:
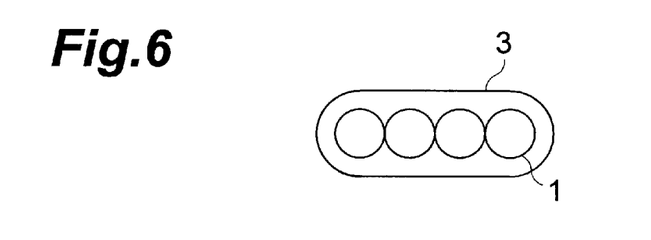
FIG. 6 is a view showing a state of disordered arrangement in optical fibers and a surface state of the ribbon type coated optical fiber.
Figure 7:
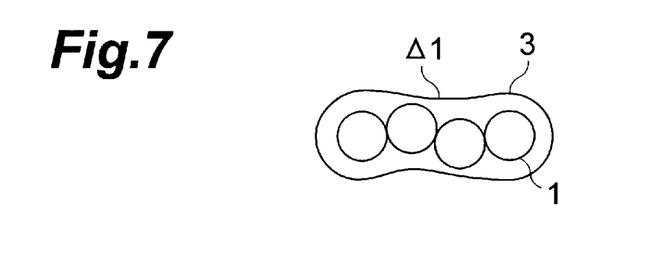
FIG. 7 is a view showing a state of disordered arrangement in optical fibers and a surface state of the ribbon type coated optical fiber.
Figure 8:
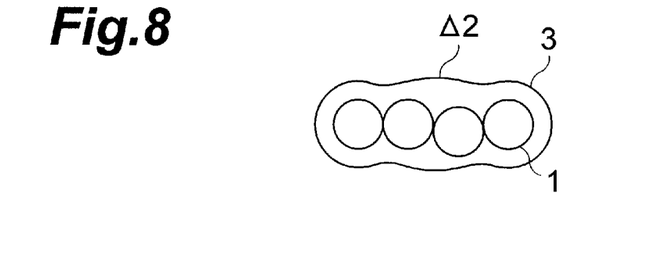
FIG. 8 is a view showing a state of disordered arrangement in optical fibers and a surface state of the ribbon type coated optical fiber.

FIGS. 6, 7, and 8 are sectional views of optical fiber ribbons showing states of disordered arrangement of optical fibers and states of irregularities in surfaces of ribbon type coated optical fibers.

FIG. 6 shows a state where there is no disorder in the arrangement of the optical fibers 1 and their surface is smoothly coated.

FIG. 7 shows a state where a disorder in arrangement is generated in the optical fibers 1 and they are coated with a depression ($\Delta 1$) in the center part of the surface.

FIG. 8 shows a state where a disorder in arrangement is generated in the optical fibers 1 and they are coated with a protrusion ($\Delta 2$) in the center part of the surface. Since the protrusion appears on the coating surface when the state of arrangement is disordered, a strong correlation exists therebetween. It is an important factor from a practical viewpoint since the optical fibers can be accommodated with a higher density as the coating surface is smoother.

Figure 9:
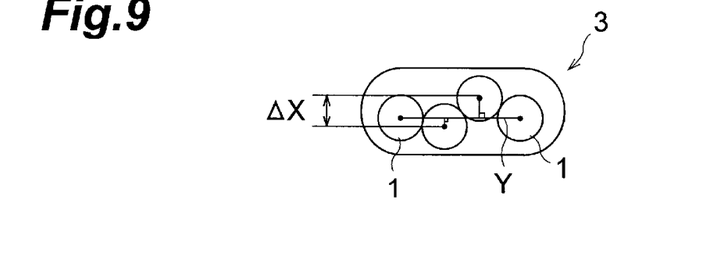
FIG. 9 is an explanatory view for defining a method of evaluating disorders in arrangement.

FIG. 9 is a sectional view for evaluating the state of disorder in arrangement of the prepared ribbon type coated optical fiber. While the respective cores of the optical fibers 1 disposed at both ends are connected by a line Y, the disorder in arrangement is defined by the greatest distance $\Delta X$ by which the positions of cores of individual optical fibers 1 located inside shift from the line Y on both sides, and becomes better as the amount of shift $\Delta X$ is smaller.

Figure 10:
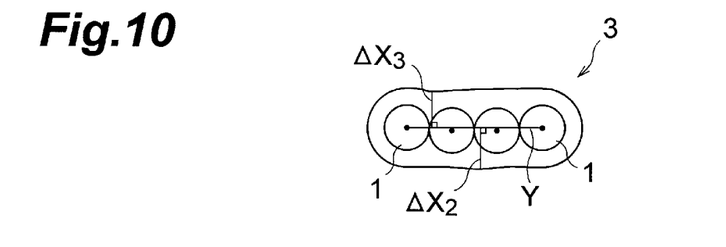
FIG. 10 is an explanatory view for defining a method of evaluating the surface state.

FIG. 10 is a sectional view for evaluating the surface state of the prepared ribbon type coated optical fiber. While the respective cores of the optical fibers 1 disposed at both ends are connected by the line Y, $\Delta X1$ indicates the difference between the maximum value $\Delta X2$ and minimum value $\Delta X3$ in the distance from the line Y to the coating surface, and is defined positive and negative when the center part is protruded and depressed, respectively. The surface state becomes better as $\Delta X1$ is smaller.

Figure 11:
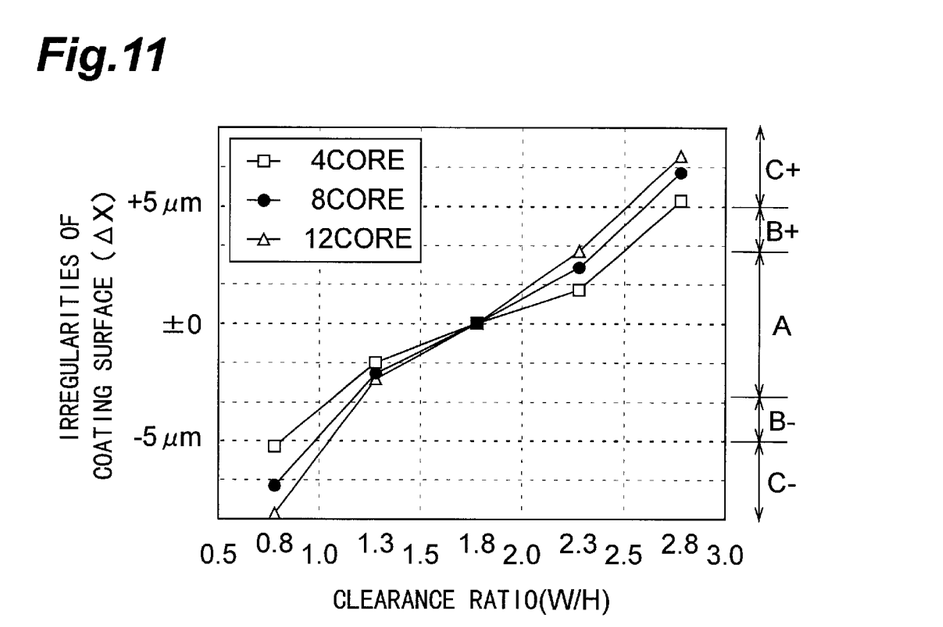
FIG. 11 is a graph showing relationships between clearance ratio W/H and irregularities in coating surfaces.

FIG. 11 is a graph showing relationships between measured surface irregularities of prototypes of ribbon type coated optical fiber made under the conditions shown in FIG. 16 and the clearance ratio W/H. For the evaluation, samples were ranked according to ΔX. The ranks are defined as follows:

Rank A: $-3\ \mu m \leq \Delta X \leq +3\ \mu m$

Rank B−: $-5\ \mu m \leq \Delta X \leq -3\ \mu m$

Rank B+: $+3\ \mu m \leq \Delta X \leq +5\ \mu m$

Rank C−: $\Delta X \leq -5\ \mu m$

Rank C+: $+5\ \mu m \leq \Delta X$

Whitened squares shown in Examples 1 to 5 and Comparative Examples 1 and 2 in FIG. 16 and in FIG. 11 indicate the results of measurement in the case where 4-core ribbon type coated optical fibers were prepared with the clearance ratio W/H being adjusted.

Comparative Example 1

In the case where the clearance ratio W/H was 0.8, a disorder in arrangement of the optical fibers 1 appeared, and a depression of 5 μm or greater occurred in the center part of the coating surface, whereby a commercial value was lost (Rank C−).

EXAMPLE 1

In the case where the W/H was set to 1.0, the disorder in arrangement of the optical fibers 1 was reduced, and the depression in the coating surface was improved to the range of 5 μm to 2 μm (Rank B−).

EXAMPLES 2 AND 3

In the respective cases where the W/H was set to 1.3 and 1.8, the disorder in arrangement of the optical fibers 1 substantially disappeared, and the coating surface was finished smoothly (Rank A).

EXAMPLE 4

In the case where W/H was set to 2.3, a very slight disorder in arrangement of the optical fibers 1 appeared, and the protrusion appearing in the center part of the coating surface was within the range of 3 μm to 2 μm, whereby the sample was employable as a conforming article (Rank A).

EXAMPLE 5

In the case where W/H was set to 2.5, a slight disorder in arrangement of the optical fibers 1 appeared, and the protrusion appearing in the center part of the coating surface was within the range of 5 μm to 3 μm, whereby the sample was employable as a conforming article (Rank B+).

Comparative Example 2

In the case where the clearance ratio W/H was 2.8, the disorder in arrangement of the optical fibers 1 increased, and a protrusion of 5 μm or greater occurred in the center part of the coating surface, whereby a commercial value was lost (Rank C+).

Such results are obtained when the viscosity of the coating resin supplied to the die orifice is within the range of 1000 to 4000 cps and the resin pressure is within the range of 0.5 to 3.0 kg/cm$^2$, and the disorder in arrangement and surface irregularities tend to increase in the outside of these ranges.

Black circles shown in Examples 6 to 10 and Comparative Examples 3 and 4 in FIG. 16 and in FIG. 11 indicate the results of measurement in the case where 8-core ribbon type coated optical fibers were prepared with the clearance ratio W/H being adjusted. Though the surface state and arrangement state having tendencies similar to those in the 4-core ribbon type coated optical fiber also appear in this case, irregularities in the coating surface tend to become greater than those in the 4-core ribbon type coated optical fiber as the clearance ratio W/H shifts from 1.8 as shown in FIG. 11. In the states of arrangement of ribbon type coated optical fiber shown in FIG. 16, "good" indicates the state where there is substantially no disorder in arrangement, whereas "poor" indicates the state where a disorder in arrangement appears.

Whitened triangles shown in Examples 11 to 15 and Comparative Examples 5 and 6 in FIG. 16 and in FIG. 11 indicate the results of measurement in the case where 12-core ribbon type coated optical fibers were prepared with the clearance ratio W/H being adjusted. Though the surface state and arrangement state having tendencies similar to those in the 4- or 8-core ribbon type coated optical fiber also appear in this case, irregularities in the coating surface tend to become further greater as the clearance ratio W/H shifts from 1.8 as shown in FIG. 11. Similar tendencies were also obtained in ribbon type optical fibers having four or more cores.

From the results shown in FIG. 11, the following conditions are preferable for preparing a ribbon type coated optical fiber with a favorable arrangement and smooth coating surface.

The clearance ratio W/H of 1.0 or less is practically unfavorable since the depression in the coating surface exceeds 5 μm (Rank C−). Effects appear when the clearance ratio W/H exceeds 1.0, since the depression would not exceed 5 μm (Rank B−); the W/H of 1.2 or greater is favorable since the depression becomes 3 μm or less (Rank A); and the surface becomes substantially smooth at 1.8, thus attaining its best state. Further, when the clearance ratio W/H increases to exceed 1.9, the state of arrangement is favorable though the protrusion in the surface (see FIG. 8) is about 2 μm (Rank A); when the clearance ratio W/H increases to exceed 2.3, the state of arrangement slightly deteriorates though the protrusion in the surface is about 2 μm (Rank B+); and the W/H of 2.5 or over is unfavorable since the protrusion in the surface exceeds 5 μm (Rank C+).

Therefore, the clearance ratio W/H is preferably within the range of 1.0 to 2.5, further preferably within the range of 1.2 to 2.3, and most preferably within the range of 1.2 to 1.9.

Whether the coating surface is favorable or not is influenced by the melt viscosity of the resin at the time of coating and the resin pressure. Therefore, it is preferred that the coating resin be supplied to the die orifice while the melt viscosity of the coating resin is held within the range of 1000 to 4000 cps in addition to satisfying the above-mentioned requirements of clearance, and the range of 2000 to 3000 cps is optimal. At a melt viscosity of 1000 cps or less, it becomes difficult to stably keep the form of the ribbon; whereas a melt viscosity of 4000 cps or greater is inappropriate for high-speed coating, and its influences upon the resin flow path may become so much that the appearance of the coating surface is likely to deteriorate.

It is also preferred that the resin be supplied to the die orifice while the resin pressure is held within the range of 0.5 to 3.0 kg/cm$^2$, and the range of 0.8 to 2.0 kg/cm$^2$ is optimal. A resin pressure of 0.5 kg/cm$^2$ or less is inappropriate for high-speed coating, whereas the coating surface would be hard to form smoothly in the lower speed portion when the resin pressure is 3.0 kg/cm$^2$ or greater.

(Embodiment 2)

Figure 12:
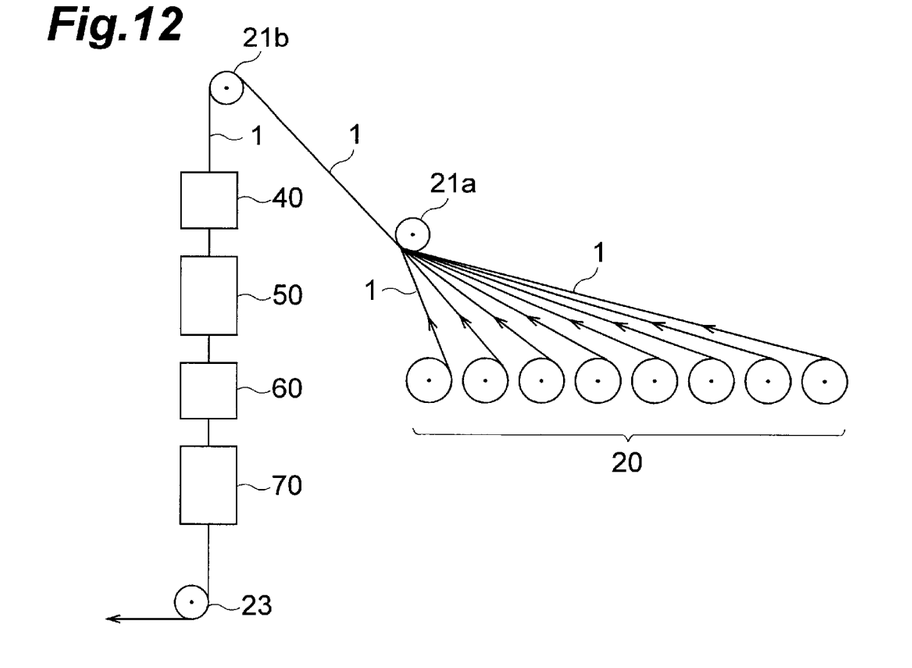
FIG. 12 is a schematic view of an apparatus for making a ribbon type coated optical fiber in a divided form in accordance with Embodiment 2.
Figure 13:
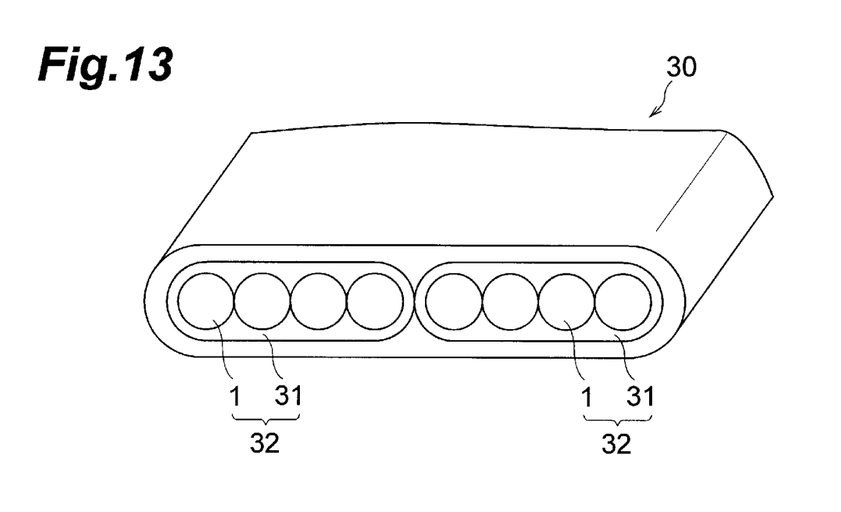
FIG. 13 is a perspective view showing the configuration of a ribbon type coated optical fiber in a divided form.

FIG. 12 is a schematic view of an apparatus for making a ribbon type coated optical fiber in a divided form in accordance with Embodiment 2. As shown in FIG. 13, the ribbon type coated optical fiber 30 in a divided form is formed by a plurality of optical fibers 1 flatly arranged parallel to each other and divided into two or more groups, sub-units 32 obtained by applying an inner layer coating resin 31 to the outer periphery of the divided plurality of optical fibers 1, and an outer layer resin 33 flatly arranged and applied to the outer periphery of two or more sub-units 32.

In the manufacturing apparatus shown in FIG. 12, a plurality of optical fibers 1 reeled out of their respective bobbins 20 are flatly aligned with each other and are divided into two or more groups while passing through grooved guide rollers 21a, 21b, so as to be supplied to a sub-unit coating apparatus 40. While passing through the coating apparatus 40, thus grouped optical fibers 1 are coated, group by group, with the inner layer resin 31 which is introduced in the arrowed direction under pressure by a pump of an unshown resin supply tank, and the resin is cured with a resin curing apparatus 50 using a heater or ultraviolet lamp, whereby two or more sub-units 32 are formed.

These plurality of sub-units 32 are supplied to an outer layer coating apparatus 60 while being flatly arranged parallel to each other, and are collectively coated with the coating resin 33 while passing through the coating apparatus 60. Subsequently, the coating is cured with a resin curing apparatus 70, so as to form the ribbon type coated optical fiber 30 in a divided form incorporating therein two or more sub-units, which is then taken up by an unshown take-up apparatus by way of a flat guide roller 23.

Figure 14:
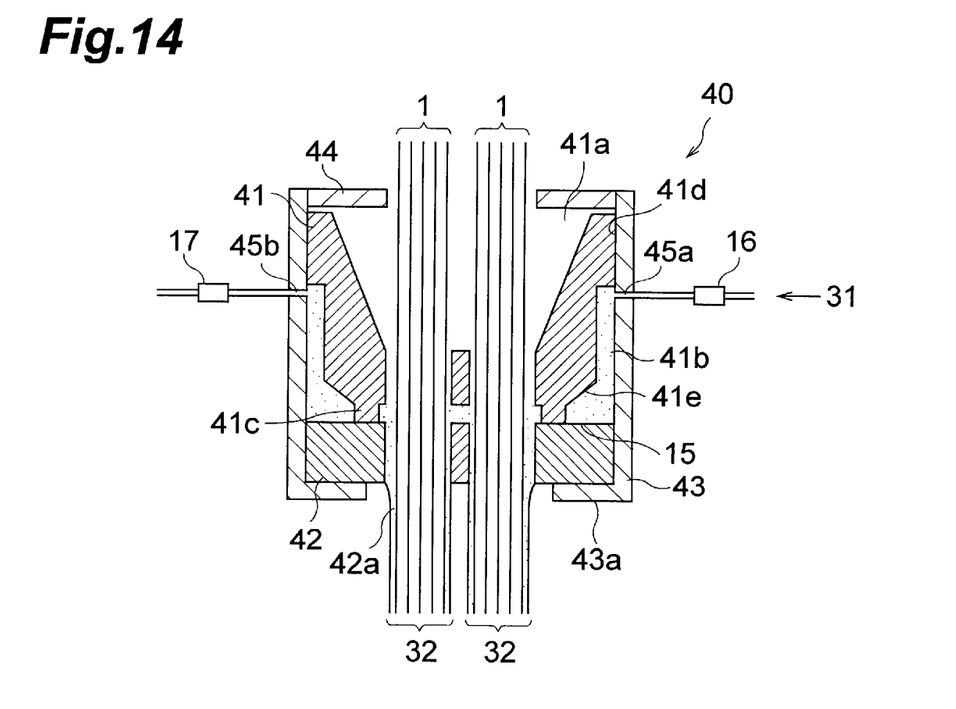
FIG. 14 is a sectional view showing the configuration of a sub-unit coating apparatus employed in Embodiment 2.

FIG. 14 is a sectional view shoring the configuration of the sub-unit coating apparatus 40 in accordance with this embodiment, in which a nipple 41 and a die 42, while forming a gap for passing the resin 31 therethrough, are accommodated in a sleeve 43 and are fixed with a lid 44 thereon. A side wall of the sleeve 43 has a resin introducing orifice 45a and a discharge orifice 45b for discharging a part of the resin, whereas a temperature sensor 16 and a pressure sensor 17 are disposed on the inlet side of the resin introducing orifice 45a and the exit side of the resin discharge orifice 45b, respectively.

In FIG. 14, the nipple 41 is a thick substantially cylindrical body having an axial nipple opening 41 communicating with two (in general, two or more) opening portions and a lower end face provided with four protrusions 41c, while providing a gap with respect to the upper face of the die 42, so as to form a flow path 15 for the resin 31. The outer periphery of nipple 41 has an outer peripheral face 41d to mate with the inner peripheral face of the sleeve 43 and an outer peripheral face 41e having a diameter smaller than that of the former outer peripheral face 41d, thereby forming a gap 41b with respect to the inner peripheral face of the sleeve 12 so that the resin 31 can pass therethrough. The nipple orifice 41a comprises, successively from the upper side, a tapered opening portion and two rectangular opening portions.

The die 42 is a disc having two (in general, two or more) die orifices 42a which are concentric with their corresponding opening portions of the nipple orifice 41a, and flat upper and lower end faces orthogonal to the die orifices 42a. Usually, each die orifice 42a is a pillar-like opening portion having a track form. The sleeve 43 is a thin cylindrical body whose lower end portion has a bottom 43a formed with an orifice in the center thereof for passing the sub-units 32 therethrough.

The unit coating apparatus 40 shown in FIG. 14 is assembled by introducing the die 42 and the nipple 41 into the sleeve 43 and screwing thereon the lid 44 having an orifice for passing the optical fibers 1 therethrough. The die 42 and the nipple 41 are secured with the sleeve bottom 43a and the lid 44.

The flow path of the coating resin will now be explained. The inner layer resin 31 is supplied from the resin introducing orifice 45a under pressure, so as to pass through the gap 41b between the outer peripheral face 41e of the nipple and the inner peripheral face of the sleeve 43, and then is uniformly supplied from the periphery of the orthogonal flow path 15 toward the center, thereby reaching the portion within the inlet portions of the two die orifices 42a. This resin 31 passes through the two die orifices 42a together with the optical fibers 1 and is collectively applied to the latter at the same time, whereby two sub-units 32 are formed.

The outer layer coating apparatus 60 is an apparatus for collectively applying the outer layer resin 33 to the outer periphery of a plurality of sub-units 30 flatly introduced parallel to each other therein, and has a configuration substantially the same as that of the coating apparatus 14 shown in FIGS. 3 and 4. Also, the resin curing apparatus 70 has the same configuration as the resin curing apparatus 50.

By preparing the ribbon type coated optical fiber 30 in a divided form by using such sub-unit coating apparatus 40 and outer layer coating apparatus 70, various studies were carried out concerning influences of the number of cores of the optical fibers 1 passing through the die orifices 42a of the sub-unit die, the ratio Ws/Hs of the clearances Ws and Hs between the die orifices 42a and the optical fibers 1, the number of sub-units 32 passing through the die orifice of the outer layer die, the ratio Wg/Hg of the clearances Wg and Hg between the outer layer die orifice and the sub-units 32, the melt viscosity of the resin 31, 33, or the resin pressure at the time of coating upon disorders in arrangement of the optical fibers 1 and irregularities in the outer layer surface. Here, each of the Ws/Hs and Wg/Hg has the same definition as that explained in conjunction with FIG. 5.

Figure 15:
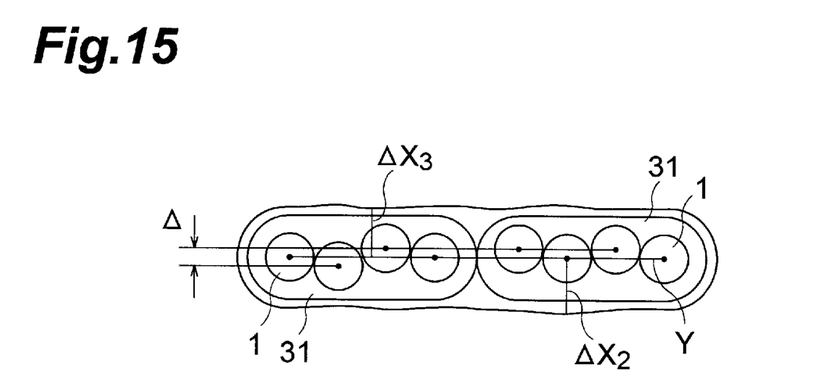
FIG. 15 is an explanatory view for defining methods of evaluating disorders in arrangement and the surface state.

FIG. 15 is a sectional view for evaluating the state of disorder in arrangement of the ribbon type coated optical fiber 30 in a divided form and the surface state thereof. While the respective cores of the optical fibers 1 disposed at both ends are connected by a line Y, the disorder in arrangement is defined by the greatest distance ΔX by which the positions of cores of individual optical fibers 1 located inside shift from the line Y on both sides, and becomes better as the amount of shift ΔX is smaller. The evaluation of surface state is defined by the difference between the maximum value ΔX2 and minimum value ΔX3 in the distance from the line Y to the coating surface, ΔX1=ΔX2−ΔX3, and is better as the difference ΔX is smaller.

Various kinds of ribbon type coated optical fiber 30 in a divided form were prepared by using the coating apparatus shown in FIG. 12, and their manufacturing conditions were studied. Sub-units in which the optical fibers 1 had four, six, and eight cores were formed, and the outer layer resin 33 was applied to two lines of sub-units 32 being supplied for each number of cores, so as to prepare the ribbon type coated optical fiber 30 in a divided form.

As a result, favorable conditions for the state of disorder in alignment of coated optical fibers and their surface state were obtained in the case where the ratio Ws/Hs of the clearance Ws in the width direction between the inner surface of the sub-unit die orifices and the outer surface of the sub-units to the clearance Hs in the thickness direction therebetween was 1.0 to 2.5, and the ratio Wg/Hg of the clearance Wg in the width direction between the inner surface of the outer layer die orifice and the outer surface of the sub-units to the clearance Hg in the thickness direction therebetween was 1.0 to 2.5.

Further preferable ranges were where the ratio Ws/Hs of the clearance Ws in the width direction to the clearance in the thickness direction was 1.2 to 1.9, and the ratio Wg/Hg of the clearance Wg in the width direction to the clearance Hg in the thickness direction was 1.2 to 1.9.

At this time, the melt viscosity of the coating resins 31 and 33 is within the range of 1000 to 4000 cps, whereas the resin pressure of the coating resins 31 and 33 is within the range of 0.5 to 3.0 kg/cm$^2$.

Also, in the method mentioned above, on the disc-shaped die 11 disposed within the cylindrical sleeve 12, the substantially cylindrical nipple 10 is disposed so as to form a gap between the outer peripheral face of the nipple 10 and the inner peripheral face of the sleeve 12, and a resin is introduced from the gap toward the die orifice 11a of the die 11, so that a plurality of optical fibers 1 positioned within the die orifice 11a are coated with this resin.

As explained in the foregoing, by setting the ratio W/H of the clearance W in the width direction provided between the die orifice of the coating apparatus and the optical fibers inserted therethrough to the clearance H in the thickness direction therebetween within the range of 1.0 to 2.5, the above-mentioned method of making a ribbon type coated optical fiber can keep the state of alignment of the ribbon type coated optical fiber and prepare the coating surface as a smooth surface.

Industrial Applicability

The present invention can be utilized in the method of making a ribbon type coated optical fiber.

What is claimed is:

1. A method of making a coated optical fiber ribbon comprising the step of inserting a plurality of optical fibers flatly arranged parallel to each other through a die orifice of a coating apparatus so as to collectively coat the optical fibers with a coating resin, wherein the ratio W/H of a clearance W in a width direction between an inner surface of said die orifice and an outer surface of said optical fibers to a clearance H in a thickness direction therebetween is set within the range of 1.0 to 2.5

2. A method of making a coated optical fiber ribbon according to claim 1, wherein the ratio W/H of said clearance W in the width direction to said clearance H in the thickness direction is within the range of 1.2 to 1.9.

3. A method of making a coated optical fiber ribbon comprising a step of, while flatly arranging a plurality of optical fibers parallel to each other, inserting the optical fibers through a die orifice of a sub-unit coating apparatus and coating the optical fibers with an inner layer coating resin so as to form at least two sub-units; and a step of, while flatly arranging at least two sub-units parallel to each other, inserting the sub-units through a die orifice of an outer layer coating apparatus and collectively coating the sub-units with an outer layer coating resin so as to form the coated optical fiber ribbon;

wherein the ratio of Ws/Hs of a clearance Ws in a width direction between an inner surface of said sub-unit die orifice and an outer surface of said sub-units to a clearance Hs in a thickness direction therebetween is set within the range of 1.0 to 2.5, and wherein the ratio Wg/Hg of a clearance Wg in the width direction between an inner surface of said outer layer die orifice and the outer surface of said sub-units to a clearance Hg in the thickness direction therebetween is set within the range of 1.0 to 2.5.

4. A method of making a coated optical fiber ribbon according to claim 3, wherein the ratio Ws/Hs of said clearance Ws in the width direction to said clearance Hs in the thickness direction is within the range of 1.2 to 1.9, and wherein the ratio Wg/Hg of said clearance Wg in the width direction to said clearance Hg in the thickness direction is within the range of 1.2 to 1.9.

5. A method making a coated optical fiber ribbon according to claim 3, wherein said sub-unit die orifice comprises a plurality of orifices provided in parallel within said same sub-unit coating apparatus.

6. A method of making a coated optical fiber ribbon according to claim 1, wherein said coating resin has a melt viscosity of 1000 to 4000 cps.

7. A method of making a coated optical fiber ribbon according to claim 3, wherein said coating resin has a melt viscosity of 1000 to 4000 cps.

8. A method of making a coated optical fiber ribbon according to claim 1, wherein said coating resin is supplied at a resin pressure of 0.5 to 3.0 kg/cm$^2$.

9. A method of making a coated optical fiber ribbon according to claim 3, wherein said coating resin is supplied at a resin pressure of 0.5 to 3.0 kg/cm$^2$.

10. A method of making a coated optical fiber ribbon according to claim 1, wherein, on a disc-shaped die disposed within a cylindrical sleeve, a substantially cylindrical nipple is disposed so as to form a gap between an outer peripheral face of said nipple and an inner peripheral face of the sleeve, and a resin is introduced from said gap toward said die orifice of said die, so that said plurality of optical fibers positioned within said die orifice are coated with said resin.

11. A method of making a coated optical fiber ribbon according to claim 3, wherein, on a disc-shaped die disposed within a cylindrical sleeve, a substantially cylindrical nipple is disposed so as to form a gap between an outer peripheral face of said nipple and an inner peripheral face of the sleeve, and a resin is introduced from said gap toward said die orifice of said die, so that said plurality of optical fibers positioned within said die orifice are coated with said resin.

* * * * *